US012812079B2

(12) United States Patent
Xia et al.

(10) Patent No.: US 12,812,079 B2
(45) Date of Patent: Nov. 24, 2026

(54) METHOD AND SYSTEM OF UNIFIED AUTOMATIC WHITE BALANCING FOR MULTI-IMAGE PROCESSING

(71) Applicant: Intel Corporation, Santa Clara, CA (US)

(72) Inventors: Yu Xia, Beijing (CN); Fuwen Li, Beijing (CN); Wei Gao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 18/559,751

(22) PCT Filed: Aug. 2, 2021

(86) PCT No.: PCT/CN2021/109996
§ 371 (c)(1),
(2) Date: Nov. 8, 2023

(87) PCT Pub. No.: WO2023/010238
PCT Pub. Date: Feb. 9, 2023

(65) Prior Publication Data
US 2024/0244171 A1 Jul. 18, 2024

(51) Int. Cl.
*H04N 9/73* (2023.01)
*G06T 5/50* (2006.01)
(Continued)

(52) U.S. Cl.
CPC ................ *H04N 9/73* (2013.01); *G06T 5/50* (2013.01); *G06T 7/11* (2017.01); *H04N 5/52* (2013.01);
(Continued)

(58) Field of Classification Search
CPC ............. G06T 5/50; G06T 2207/20221; G06T 2207/30252; G06T 7/11; G06T 2200/32; G06T 2207/20212; G06T 7/30; H04N 23/88; H04N 23/90; H04N 5/52; H04N 9/73; H04N 1/3876; H04N 23/698; H04N 7/181
See application file for complete search history.

(56) References Cited

U.S. PATENT DOCUMENTS 10,455,159 B2 * 10/2019 Okada .................... H04N 23/71
2003/0086002 A1 * 5/2003 Cahill .................. H04N 1/3876
348/218.1
(Continued)

FOREIGN PATENT DOCUMENTS

CN 105721846 6/2016
CN 106105188 11/2016
(Continued)

OTHER PUBLICATIONS

Liu, Yucheng, and Buyue Zhang. "Photometric alignment for surround view camera system." 2014 IEEE International Conference on Image Processing (ICIP). IEEE, 2014.*
(Continued)

*Primary Examiner* — Emily C Terrell
(74) *Attorney, Agent, or Firm* — Hanley, Flight & Zimmerman, LLC

(57) ABSTRACT

A method, system, and article provide unified automatic white balancing for multi-image processing.

20 Claims, 8 Drawing Sheets

(51) Int. Cl.
*G06T 7/11* (2017.01)
*H04N 5/52* (2006.01)

(52) U.S. Cl.
CPC ............... *G06T 2207/20221* (2013.01); *G06T 2207/30252* (2013.01)

(56) References Cited

U.S. PATENT DOCUMENTS

2007/0285282 A1 12/2007 Nakayama et al.
2008/0297624 A1* 12/2008 Shingu ...................... G06T 5/50 382/190
2015/0054980 A1 2/2015 Nikkanen et al.
2016/0182874 A1 6/2016 Richards et al.
2016/0381303 A1 12/2016 Takami
2018/0359399 A1 12/2018 Ito et al.
2019/0092239 A1 3/2019 Yamada et al.
2019/0325580 A1* 10/2019 Lukac ................... G06T 3/4038
2020/0202581 A1* 6/2020 Kawaguchi ............... G06T 3/20
2024/0331209 A1* 10/2024 Griffin ...................... B60R 1/23
2025/0157170 A1* 5/2025 Ren ....................... G06T 3/4015

FOREIGN PATENT DOCUMENTS

CN 108476308 8/2018
CN 109040613 12/2018

OTHER PUBLICATIONS

Sakharkar, Vrushali S., and S. R. Gupta. "Image stitching techniques—an overview." Int. J. Comput. Sci. Appl 6.2 (2013): 324-330.*
International Search Report and Written Opinion for PCT Patent Application No. PCT/CN2021/109996, dated Apr. 26, 2022.
International Searching Authority, "International Preliminary Report on Patentability," issued in connection with International Patent Application No. PCT/CN2021/109996, mailed on Feb. 6, 2024, 5 pages.

* cited by examiner

METHOD AND SYSTEM OF UNIFIED AUTOMATIC WHITE BALANCING FOR MULTI-IMAGE PROCESSING

CLAIM OF PRIORITY

This Application is a National Stage Entry of, and claims priority to, PCT Application No. PCT/CN2021/109996, filed on Aug. 2, 2021 and titled "METHOD AND SYSTEM OF UNIFIED AUTOMATIC WHITE BALANCING FOR MULTI-IMAGE PROCESSING", which is incorporated by reference in its entirety for all purposes.

BACKGROUND

Multi-camera surround view is an automotive feature that usually provides a driver with an overhead view of a vehicle and the immediate surrounding area to assist the driver with driving, parking, moving in reverse, and so forth. The surround view can help the driver by revealing obstacles near the vehicle. The surround view also can be used to assist with autonomous driving by providing images for computer vision-based intelligent analysis. In a conventional system, surround view images are captured from four to six digital cameras on the vehicle and then stitched together to form the surround view and display it on a screen on the dashboard of the vehicle.

The processing of images from each camera of the surround view includes automatic white balance (AWB) in order to provide accurate colors for pictures reproduced from the captured images. AWB is a process that first finds or defines the color white in a picture called the white point. The other colors in the picture then are determined relative to the white point using AWB gains.

To perform AWB, the conventional surround view system determines an independent AWB at each camera, which results in inconsistent color from image to image that is stitched together to form the surround view. Known post-processing algorithms are used to reduce the inconsistency in color. These post-processing algorithms, however, often require a large computational load and in turn result in relatively large power consumption and use a large amount of memory. In some conditions, the undesired and annoying color differences from image to image are still noticeable and result in unrealistic images anyway.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
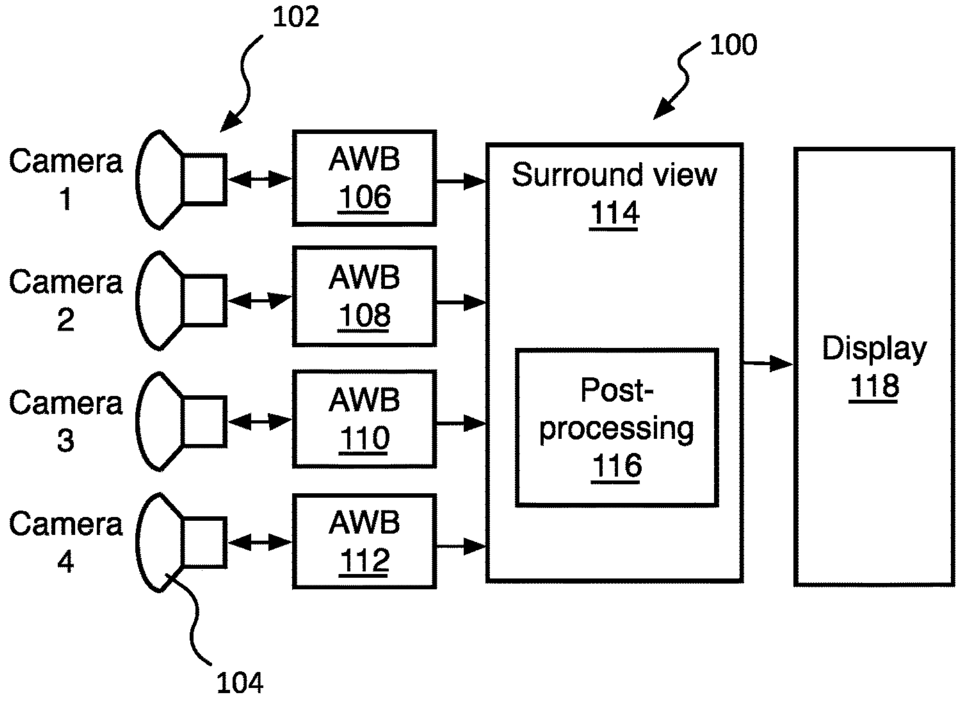
FIG. 1 is a schematic diagram of a conventional surround view image processing system.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or commercial or consumer electronic (CE) devices such as camera arrays, on-board vehicle camera systems, servers, internet of things (IoT) devices, virtual reality, augmented reality, or modified reality systems, security camera systems, athletic venue camera systems, set top boxes, computers, lap tops, tablets, smart phones, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM);

magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below for unified automatic white balancing for multi-image processing.

As mentioned above, images of multiple cameras of a conventional surround view system of a vehicle each have their own automatic white balance (AWB) before the images are stitched together. The white points, and in turn, the colors may vary from image to image due to the differences in lighting, shading, and objects within the field of view of different camera perspectives as well as manufacturing variances among cameras, whether in the hardware or software. These conditions can cause variations in chromaticity response or color shading. Slight color changes from image to image in a surround view can be easily detected by the average person viewing the image. Thus, a vehicle driver may see that the color of the surround view seems incorrect which can be distracting and annoying, and appears to be a low quality image that negatively affects the viewer's experience.

Referring to FIG. 1 for more detail, a conventional surround view system 100 typically operates in two stages including an image capture stage where cameras 104 (here, cameras 1 to 4) of a camera array 102 capture images around a vehicle, and an image stitching stage to create the surround view. In detail, once the images are captured, separate AWB units 106, 108, 110, and 112 perform separate AWB operations on each camera 1 to 4 (104) to form separate AWB-corrected images. These AWB-corrected images, each with its own different AWB, are then provided to a surround view unit 114. The surround view unit 114 then stitches the AWB-corrected images together to form a surround view.

Due to illumination and scene differences as mentioned, the white balance correction for each camera is almost always significantly different. Thus, it is very challenging to compose a surround view picture with a more consistent color. In order to compensate for these variations in color, a conventional post-processing algorithm is used after the images are stitched together to form a 360 degree or overhead surround view. Here, the surround view unit 114 has a post-processing unit 116 to correct the variations in color data of the surround view typically in the overlap areas between adjacent images. Most AWB post-processing after stitching includes analyzing luminance and color differences at the overlapped regions, and then performing extra computations required to correct the color differences for the surround view. This is often accomplished by using interpolation. This kind of processing introduces a very large overhead in computational load and uses a large amount of memory while still failing to properly correct color differences in extreme cases anyway. Once the surround view is corrected, it may be provided to a display unit 118 to display the surround view, typically on a screen on a dashboard of a vehicle.

To resolve these issues, the disclosed AWB system and method reduce or eliminate undesired and uncontrolled color changes and color inconsistencies in a surround view while removing the need for AWB post-processing, thereby reducing the computational load of AWB and surround view generation. This is accomplished by generating a unified automatic white balance that is used on all or multiple images from different cameras of a camera array that provides images of the same or substantially same instant in time (unless the scenes or environment captured by the cameras is fixed). The disclosed method generates the unified automatic white balance (UAWB) by factoring overlapping segments of the images to be stitched together and the motion of a vehicle when the camera array is mounted on the vehicle.

Particularly, initial AWB-related values (such as the white points or AWB gains) may be generated separately for each non-lapping and overlapping segment of the field of view (FOV) of each image being stitched together. The initial AWB-related values, whether AWB white points or AWB gains, then may be adjusted by segment weights provided to individual segments of the images and/or camera weights provided to images of different cameras in the camera array. The segment weights properly allocate a proportion of the UAWB that overlap the same region in the surround view so that each region of the surround view receives a more uniform AWB whether or not the segments overlap in a region of the surround view. Also, camera weights of each camera can be factored and may depend on the motion of the vehicle. The camera facing the direction of motion more directly then the other cameras will receive the largest weight to contribute a greater portion of the UAWB. This is based on the fact that the driver of a vehicle is most likely facing the direction of motion so that colors on the part of the surround view showing the direction of motion are more likely to be noticed by the driver. Thus, other parts of the surround view intentionally may have color that is still not completely accurate when the environment around the vehicle is in extreme differences, such as when one side of the vehicle is in sun and another side is in shade. This is considered a better, controlled solution then having all parts of the surround view with more inaccurate unrealistic colors.

The weighted initial AWB-related values (whether white points or gains) then may be combined, such as by summing or averaging, for each color scheme channel being used, and the combined AWB values then may be used to form unified AWB gains that form the unified AWB (UAWB). In this case then, the same unified AWB gains will be applied to all or multiple images captured at the same or substantially same time instant from the camera array to provide UAWB-adjusted images for surround view generation.

Figure 2:
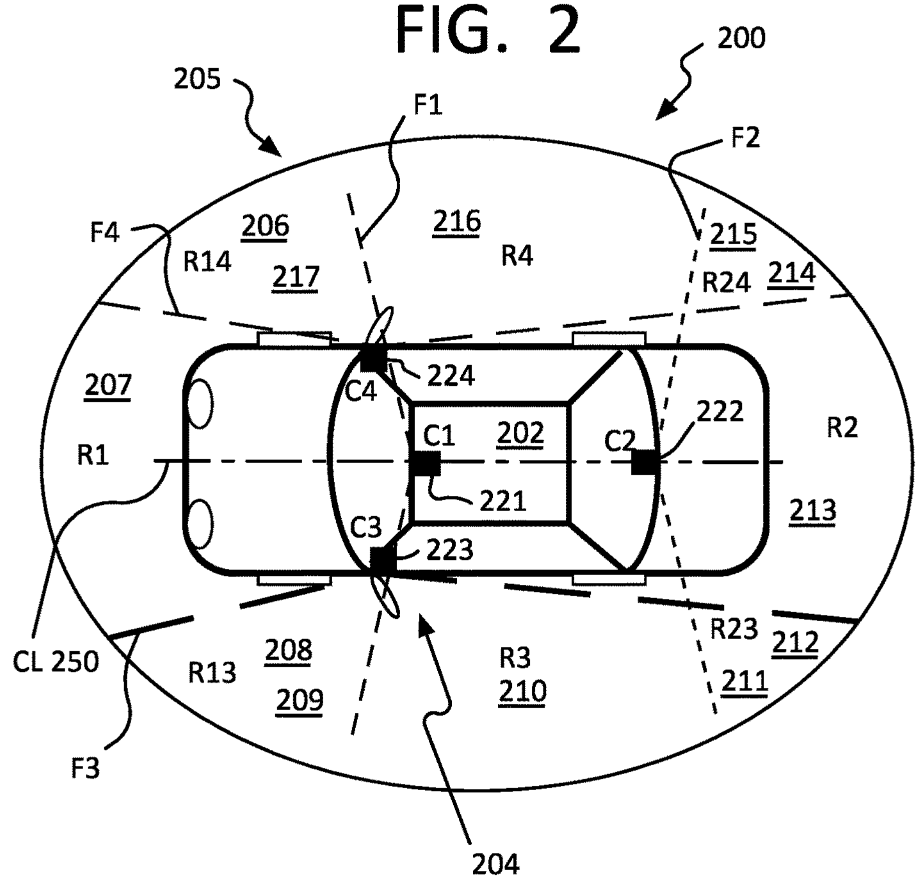
FIG. 2 is a schematic diagram of an overhead surround view of a vehicle in accordance with at least one of the implementations herein.

Referring to FIG. 2, an example vehicle setup 200 may be used to provide images for the disclosed system and method of surround view with unified AWB. By one form, a vehicle 202 has a camera array 204 with four cameras: front camera C1, rear camera C2, left side camera C3, and right side camera C4 numbered 221-224, respectively. The cameras 221-224 may be mounted on the vehicle 202 to point outward and at locations to form at least some field of view overlap with adjacent cameras to assist with stitching alignment for surround view generation. The vehicle 202 also has a center reference axis or line CL 250 that defines straight travel along or parallel to the line and that is used as a reference line to measure turning angles as discussed below.

The camera array 204 collectively forms a horizontal 360 degree field of view 205, although it could include 180 degree vertical coverage as well, where different dashed lines F1 to F4 indicate the field of view (FOV) for cameras C1 to C4 respectively. Each FOV includes three segments of the individual images of each camera. Each FOV F1 to F4 also forms three regions of the surround view. Specifically, the cameras are located, oriented, and calibrated so that the field of view of each camera, and in turn the image created from the camera, generates non-overlapped and overlapped segments. In the present example, the four cameras C1-C4 form non-overlapped segment 207 in region R1, segment 213 in region R2, segment 210 in region R3, and segment 216 in region R4 that are field of view (FOV) segments that can be captured only with a single camera (C1, C2, C3 or C4) exclusively, and as shown respectively. On the other hand, overlap (or overlapped) segments share (or overlap in) the same region of the surround view. For example, segment 206 from FOV F1 and segment 217 from FOV F4 share region R14, while segment 208 from FOV F1 and segment 209 from FOV F3 share region R13. Overlap segment 211 of FOV F3 and segment 212 of FOV 2 share region R23, while segment 214 of FOV 2 and segment 215 of FOV 4 share region R24. It will be appreciated that more or less cameras could be used instead.

For each camera therefore, a full FOV of a single camera is formed by combining its three segments, and including one non-overlapped center region between two overlapped left and right FOV regions from a left camera and right camera adjacent to a center camera forming the non-overlapped region. The full FOV of the four cameras as described above may be listed here as follows with regions and segments in respective order:

$$FOVF1 \text{ of Camera } C1 = \{\text{regions } R13, R1, R14\} = \{\text{segments } 208\text{–}206\} \quad (1)$$

$$FOVF2 \text{ of Camera } C2 = \{\text{regions } R23, R2, R24\} = \{\text{segments } 212\text{–}214\} \quad (2)$$

$$FOVF3 \text{ of Camera } C3 = \{\text{regions } R13, R3, R23\} = \{\text{segments } 209\text{–}211\} \quad (3)$$

$$FOVF4 \text{ of Camera } C4 = \{\text{regions } R14, R4, R24\} = \{\text{segments } 217\text{–}215\} \quad (4)$$

where the dashed lines set the extent of each individual camera FOV, and in turn, the separation lines between segments. This setup may be used by the AWB system and methods described below. It also will be appreciated that the vehicle setup 200 may be a surround view. The roof and other parts of the vehicle 202 that are not in a camera FOV may be added to the surround view artificially so that a viewer sees the entire vehicle. Otherwise, other surround views may be generated that are other than an overhead view such as a side view.

Figure 3:
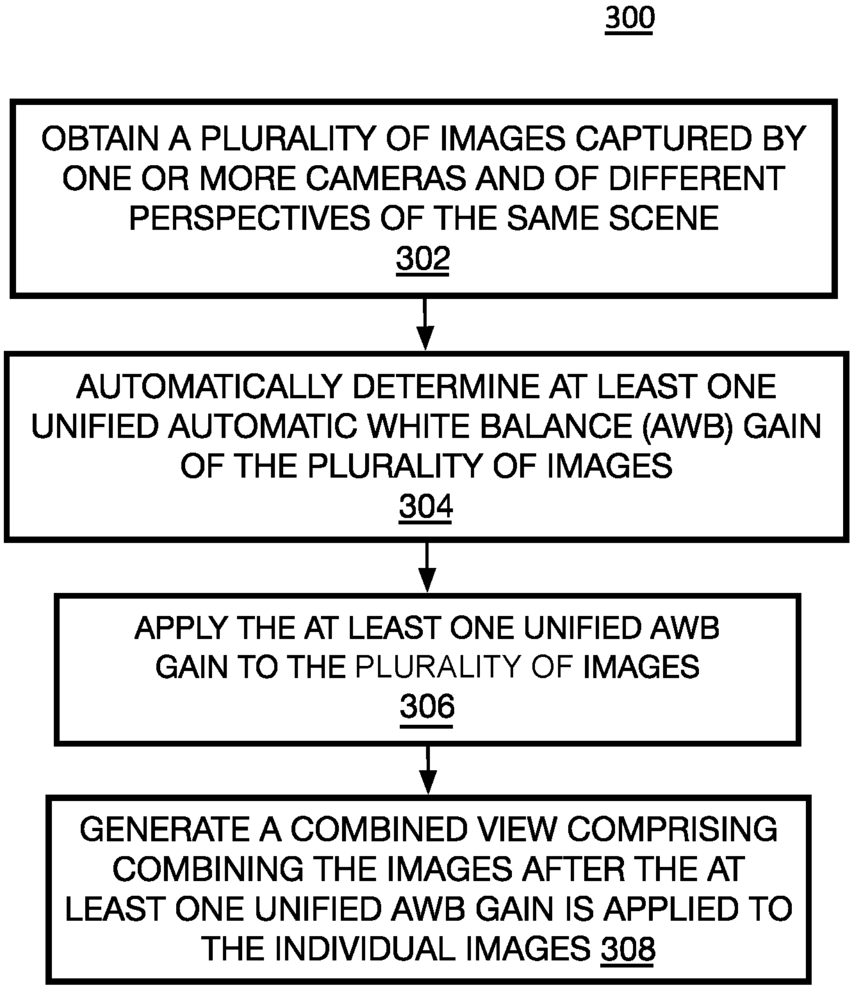
FIG. 3 is a flow chart of an example multi-image processing method with unified AWB in accordance with at least one of the implementations herein.

Referring to FIG. 3, an example process 300 of unified automatic white balancing for multi-image processing is described herein. In the illustrated implementation, process 300 may include one or more operations, functions, or actions as illustrated by one or more of operations 302 to 308, numbered evenly. By way of non-limiting example, process 300 may be described herein with reference to example image processing system of FIGS. 2, 4, and 6, where relevant.

Process 300 may include "obtain a plurality of images captured by one or more cameras and of different perspectives of the same scene" 302. Scene here generally refers to the environment in which the cameras are located, so that cameras facing outwardly from a central point and in different directions still are considered to be capturing the same scene. By the example form, the images are formed by a camera array mounted on a vehicle and facing outward from the vehicle to form forward, rearward, and side views that overlap. By some alternatives, the camera array is not fixed on vehicles, but on building, or other objects.

Process 300 may include "automatically determine at least one unified automatic white balance (AWB) gain of the plurality of images" 304. This may involve dividing the single camera FOVs into segments with one or more non-overlapping segments captured by a single camera and overlapping segments with the same region of the total FOV captured by multiple cameras. Thus, each camera FOV, and in turn each image, may have a non-overlapping segment and overlapping segments. An initial AWB-related value, which may be an initial white point (WP) and/or initial WB gains, may be generated for each or individual segment. The initial WB gains may be modified by weights, and combined such as averaged (or summed) to generate a single per-segment weighted initial AWB-related value, which may be an average and that is the same for all segments. This is repeated for each color scheme channel being used (such as in RGB), and then used to generate unified AWB gains with one for each color channel.

The weights may include segment weights or camera weights or both. The segment weights are set to reduce the emphasis of a single overlapping segment so that overlapping segments cooperatively have the same (or similar) weight in a region of the surround view as a single non-overlapping segment forming a region of the surround view. This is performed so that each region of the surround view has the same or similar influence on a unified white point and so that overlapping segments are not over-emphasized. By one approach, each or multiple camera FOVs may be divided into a center non-overlapping segment and two end overlapping segments, where each non-overlapping segment has a weight of 0.5 and each overlapping segment has a weight of 0.25. By one alternative, the segment weights could be used as the only weights to modify the initial AWB-related values (such as the initial WP or initial AWB gains).

It has been found, however, that the experience of a viewer or driver in a vehicle is improved even more when the vehicle motion also is factored into the weights when the camera array is mounted on a vehicle. This assumes the viewer gives more attention or focus to the area of the surround view that shows or faces a direction of motion of the vehicle in contrast to other directions represented on the surround view. Thus, camera or motion weights also can be generated that are larger in the direction of motion of the vehicle. Specifically, the weights may be set to emphasize the image from the camera (or cameras) facing the direction of travel whether that's forward, turning, or backward. By one form, the camera weights are modified depending on the amount of the turning angle while the vehicle is turning. The camera weight may be related to a ratio or fraction of actual vehicle turning angle (which is typically about 0 to 30 or 0 to 50 degrees by one example) relative to a reference line (such as CL FIG. 2) that is straight forward on a vehicle, and over a total available driver attention angle such as 90 degrees from a front or rear of the vehicle to the side of the vehicle. By one form, the camera weights of (1) the forward or rear camera, and (2) one of the side cameras may be proportional to the turning angle. By one alternative form, the camera weights may be used without the use of segment weights, or vice-versa.

Once or as the weights are generated, the initial AWB-related values may be weighted, and the weighted initial AWB-related values may be combined, such as averaged, so that the combined AWB-related values can be used to generate the unified AWB, including unified AWB gains. Other examples are provided below.

Process 300 may include "apply the at least one unified AWB gain to the plurality of images" 306, where the same unified AWB (including the same unified AWB gains of multiple color scheme channels) is applied to all or individual images of a same or substantially same time point from the camera array (unless the scene is fixed and cameras are moving to capture multiple FOVs each). Thus, the same unified AWB gain (or gains) are applied to each of the images generated by a camera array and to a set of images captured at the same or substantially same time (unless the scene is fixed). This may be repeated for each image (or frame) or some interval of time or interval of frames of a video sequence forming the images at each camera.

Process 300 may include "generate a combined view comprising combining the images after the at least one unified AWB gain is applied to the individual images" 308. Where the images already modified by a unified AWB are now stitched together, and may form a surround view of a vehicle and that is displayed on the vehicle. By one form, the view may be an overhead or top view often used for parking on vehicles although other side views could be generated instead. By an alternative form, the method herein may be used on a building instead of a vehicle as part of a security system of the building. The camera array may be mounted on other types of vehicles other than wheeled vehicles, such as boats, drones, or planes, or other objects rather than a vehicle or building.

Figure 4:
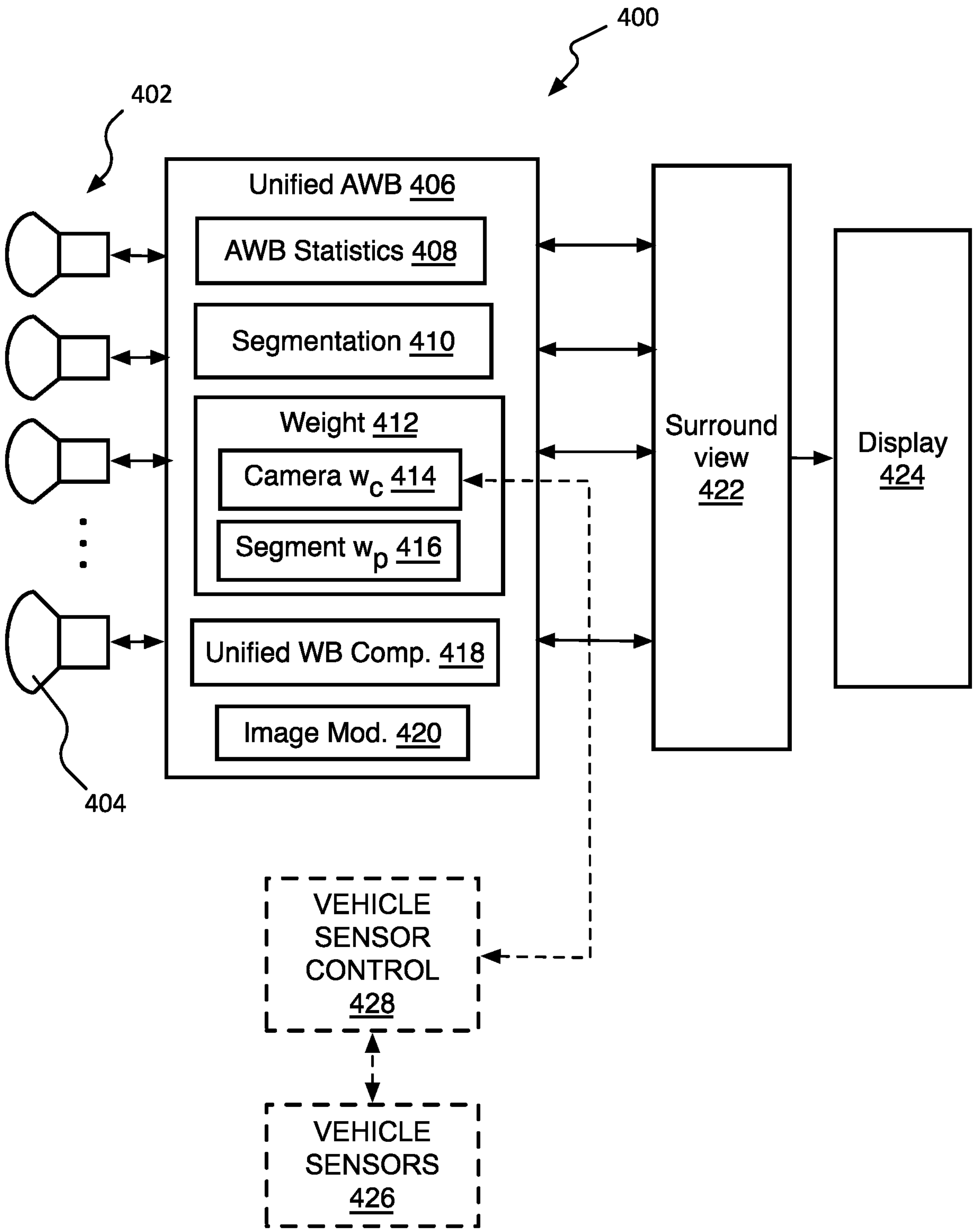
FIG. 4 is a schematic diagram of a surround view image processing system with unified AWB in accordance with at least one of the implementations herein.

Referring to FIG. 4, an example image processing system or device 400 performs automatic white balancing according to at least one of the implementations of the present disclosure. Specifically, an image processing system or device 400 has a camera array 402 of 1 to N cameras 404. The cameras may be regular, wide angle, or fish eye cameras, but are not particularly limited as long as the AWB and image stitching can be performed on the images. A pre-processing unit, not shown, may pre-process the images form the cameras 404 sufficient for AWB and surround view generation described herein.

A unified AWB unit (or circuit) 406 receives the images and uses the images to first generate a unified AWB and then apply the unified AWB to the images. The unified AWB unit 406 may have an AWB statistics unit 408 to obtain statistics of the images that may be used by AWB algorithms to generate initial AWB-related values such as white points and WB gains of the images. A segmentation unit 410 sets the segment locations of the FOVs of the cameras. This may be predetermined with manufacture, placement, and calibration of the cameras on a vehicle for example. A weight unit 412 generates camera weights $w_c$ 414 that factor vehicle motion and/or segment weights $w_p$ 416 that provide per segment weights to modify initial WB gains as described herein. The motion for the camera weights may be detected by vehicle sensors 426 managed by a vehicle sensor control 428. The sensors may include accelerometers and so forth, and the vehicle sensor control 428 may provide motion indicators to the camera or motion weight unit 414 at the weight unit 412.

A unified WB computation unit 418 uses the weights to adjust initial AWB-related values, and then combines the weighted AWB-related values to generate sums or averages, and separately for each color scheme channel. The average AWB-related values are then used to generate the unified AWB gains. The unified AWB gains are then applied to the images by an image modification unit 420 to better ensure consistent color on the surround view without performing the AWB post-processing.

A surround view unit 422 then obtains the AWB corrected images and stitches the images together. Thereafter, the surround view may be provided to a display unit 424 for display on the vehicle or other location, or stored for later display, transmission, or use.

Figure 5:
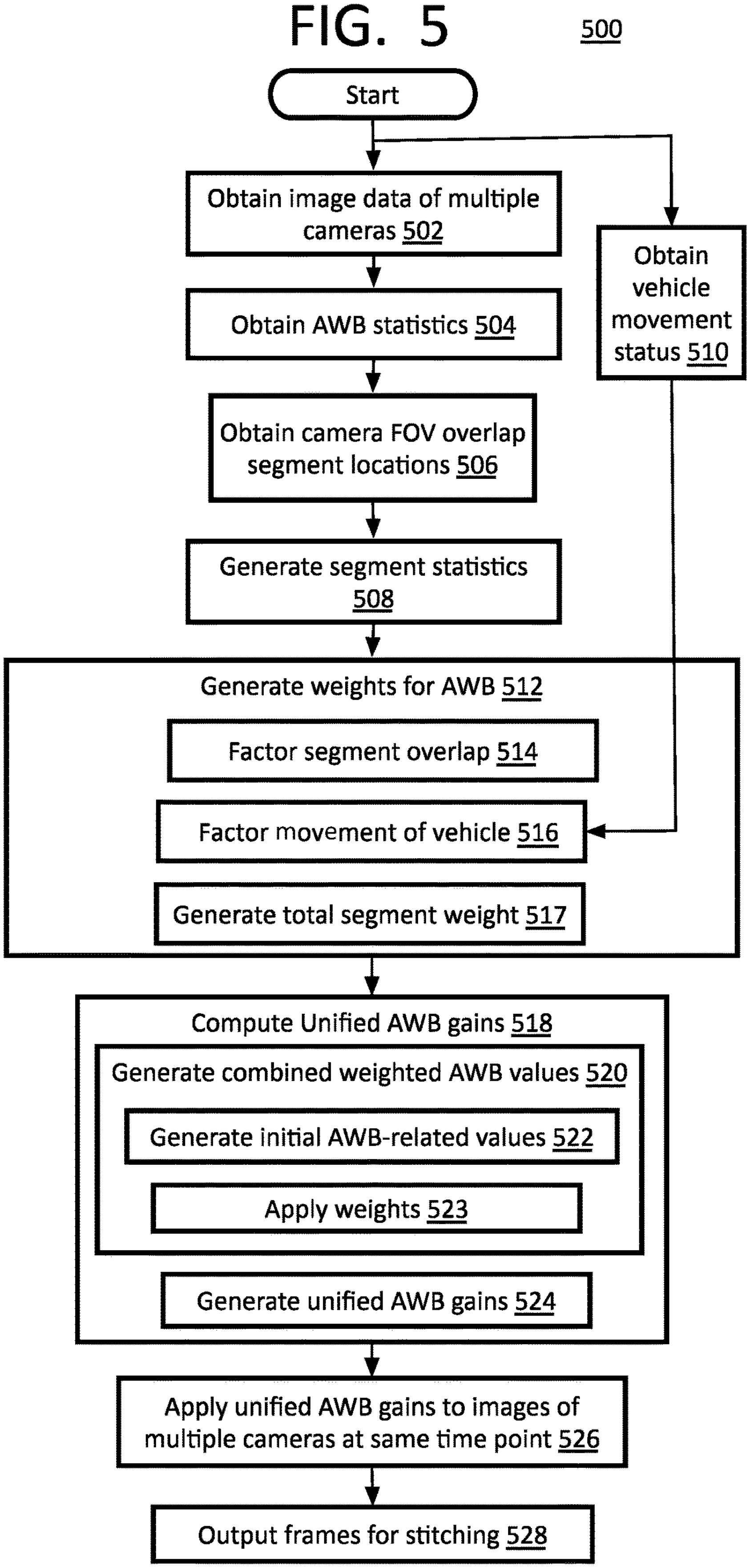
FIG. 5 is a flow chart of a detailed example multi-image processing method with unified AWB in accordance with at least one of the implementations herein.

Referring to FIG. 5, an example computer-implemented method of unified automatic white balancing for multi-image processing is described herein. Process 500 may include one or more operations, functions, or actions as illustrated by one or more of actions 502 to 528 generally numbered evenly. By way of non-limiting example, process 500 may be described herein with reference to example vehicle setup 200 (FIG. 2) and image processing systems 400 or 600 of FIG. 4 or 6, respectively, and where appropriate.

Process 500 may first include "obtain image data of multiple cameras" 502, and by this example, a camera array may be mounted on a vehicle or other object where the cameras face outward at different directions to capture different perspectives of a scene (or environment) as described with camera array 204 (FIG. 2) or 402 (FIG. 4). The vehicle may be a car, truck, boat, plane, and anything else that moves and can carry the camera array including self-driving vehicles such as a drone. When a vehicle is provided that does not travel on the ground, then the cameras may cover 360 degrees in all directions. The cameras may each record video sequences, and the process may be applied to each set of images captured at the same time (or substantially the same time) from the multiple cameras. The process may be repeated for each such set of images or at some desired interval of sets along the video sequences. Alternatively, a single camera could be used and moved to different perspectives when capturing a fixed scene.

Obtaining the images may include raw image data from the multiple cameras being pre-processed sufficiently for at least AWB operations and surround view generation. The pre-processing may include any of resolution reduction, Bayer demosaicing, vignette elimination, noise reduction, pixel linearization, shading compensation, and so forth. Such pre-processing also may include image modifications, such as flattening, when the camera lenses are wide angle or fish eye lenses for example. The images may be obtained from the cameras by wired or wireless transmission, and may be processed immediately, or may be stored in a memory made accessible to AWB units for later use.

Process 500 may include "obtain AWB statistics" 504. Specifically, AWB algorithms usually use AWB statistics as input to perform white balance (or white point) estimation and then determine white balance gains. For this operation, AWB statistics, or data used to generate AWB statistics, are captured from each camera to be included in the surround view. The AWB statistics may include luminance values, chrominance values, and averages of the values in an image, luminance and/or chrominance high frequency and texture content, motion content from frame to frame, any other color content values, picture statistical data regarding deblocking control (for example, information controlling deblocking and/or non-deblocking), RGBS grid, filter response grid, and RGB histograms to name a few examples.

Process 500 may include "obtain camera FOV overlap segment locations" 506, where the camera segment definitions may be predetermined with the mounting and calibration of the cameras on the vehicle or other object. The overlap segments for a ground based vehicle, such as cars or trucks, may be a pre-determined or preset pixel area of a top or other view image from each camera where each image originally may be a curved wide angle or fisheye image that is flattened to form top or other view images for stitching together to form the surround view. It will be understood that instead of a top view, any setup with multiple cameras with overlapping camera FOVs may have pre-defined overlapped regions that can be measured and determined by pixel coordinates via calibration, for example. By one form, the segments are each defined by a set of pixel locations in top or other desired view of the vehicle, such as at the start (camera origin) and a deemed end of the dashed lines defining the segment separators as shown on FIG. 2. These locations may be stored in a memory accessible so that an AWB unit can retrieve the locations.

Process 500 may include "generate segment statistics" 508, where the input AWB statistics for each camera is separated into three parts: an overlapped FOV region with a left camera (thereby having two overlapping segments from two cameras), exclusive or non-overlapped FOV region (or segment) for camera C[i] being processed, and an overlapped FOV region with a right camera (also having two overlapped segments from two cameras), and as defined on setup 200 and surround view 205 (FIG. 2). In this operation, the AWB statistics are separated into three parts for each camera based on the predetermined pixel location boundaries of the segments as described above and that separate the statistics into the two overlapped segments and center non-overlapped segment. The index enumeration $fov_{pos}$ for these segments and of a single camera FOV may be considered as:

$$enum\,fov_{pos} = \{\text{left, center, right}\} \tag{5}$$

Thus, for each camera C[i] contributing an image to the surround view, statin[i] may be separated into $stat_{seg}[i][j]$, where $i \in [1, N]$ cameras, and $j \in fov_{pos}$ field of view segments. This permits configurable weights for white balance correction that can be different for each segment within the same single camera FOV in addition to any differences from camera to camera.

Process 500 may include "obtain vehicle movement status" 510. Here, when the weights are to factor vehicle movement, then camera weights are also generated. This is performed so that the accuracy of the white balance emphasizes a camera (or cameras) facing the direction the vehicle is moving. This assumes the viewer is a driver of the vehicle and the driver's attention is mostly focused on the area of a surround view that shows a part of the scene that is in the direction of movement of the vehicle. The term "emphasizing" here refers to the AWB being more accurate for the direction-facing camera(s) than for the other cameras. This acknowledges that the images can be very different for cameras of different perspectives in the camera array and in terms of white point. For example, one side of a vehicle could be in, and facing, dark shade caused by a building or garage, while the opposite side of the vehicle could be out in the open, and facing, bright sunshine. In such an extreme difference, the unified AWB cannot be precisely accurate for all sides of the vehicle. In this case, the unified AWB is a compromise and is as close to the correct AWB as possible for all sides of the vehicle except for emphasis given to cameras facing the direction of motion of the vehicle. In this case, the camera facing the direction of motion is emphasized while the cameras in an opposite direction (or non-moving directions) will be de-emphasized.

For example, when the vehicle is moving straight back in reverse, rear camera C2 (FIG. 2) should be the camera with the highest priority for AWB correction to get better accuracy in color in the direction the viewer or driver would be looking, and in turn, the area of a surround view most likely to get the focus of the driver or user. Thus, the direction of vehicle motion $vehicle_{dir}$ can be tracked.

The vehicle direction tracking can be performed by a vehicle control as mentioned above on system 400 (FIG. 4), and may include sensing or tracking with an accelerometer or other known vehicle sensors. The control then may provide the AWB unit 406 (FIG. 4) an indicator to indicate the vehicle motion. By one example, $vehicle_{dir}$ denotes an input vehicle moving direction where $vehicle_{dir} \in \{-1,0,1\}$ as follows:

$$vehicle_{dir} = \begin{cases} -1, & \text{vehicle moves backward} \\ 0, & \text{vehicle is stopped} \\ +1, & \text{vehicle moves forward} \end{cases} \tag{6}$$

The camera weights also should factor turning of the vehicle since the driver's attention may be to the left or right side of the vehicle while turning the vehicle. Thus, as with the straight movement directions above, the weight for a camera facing the left or right side of the vehicle should be greater depending on a turning direction (left or right) and the amount of turn (or steering amount) in that direction. Thus, the camera weights also may be determined by determining a turn indicator $vehicle_{turn}$ as follows.

A vehicle turn angle $vehicle_{turn}$ may be a measure of how much the wheels have turned from a reference center axis CL (FIG. 2 for example) of the vehicle pointing straight forward and that is the previous direction of the vehicle. This operation may use the vehicle's sensors that sense the position of any of the steering wheel, steering shaft, steering gear box, and/or steering arms or tie rods as is well known. The vehicle sensor control may receive sensor data and indicate the turn status to the AWB unit.

By one approach, $vehicle_{turn}$ denotes a turn angle as the turn position of the wheel (and as steered by the driver) and relative to the reference line as follows.

$$vehicle_{turn} \in [-a_m, +a_m] \tag{7}$$

where $a_m$ is 0 to a maximum angle that the vehicle wheels can turn in degrees from a center axis of the vehicle, which is typically about 30 to 50 degrees and at most should be about equal or less than 90 degrees, and where the values indicate the following:

$$\begin{cases} \text{vehicle}_{turn} < 0, & \text{vehicle turns left} \\ \text{vehicle}_{turn} = 0, & \text{vehicle stays straight} \\ \text{vehicle}_{turn} > 0, & \text{vehicle turns right} \end{cases} \quad (8)$$

As a result, vehicle motion indicators [$\text{vehicle}_{dir}$, $\text{vehicle}_{turn}$] may be provided from the vehicle sensor control to the AWB unit to factor vehicle motion to generate camera weights. The motion data may be provided to the AWB unit continuously or at some interval, such as every 16.67 ms for a video frame rate at 60 fps, or 33.33 ms for a video frame rate at 30 fps, and so forth. The times that sensor indicators are provided to the AWB unit may or may not be the same time or intervals used by the AWB unit to set the turn angle of the vehicle for unified AWB computation. By one form, the sensor data should be provided to the AWB unit timely according to the frame rate of the input video. The higher a frame rate, the more often sensor data should be sent to the AWB unit. By one option, the vehicle motion indicators may be provided whenever the vehicle is in a surround view mode rather than an always-on mode.

Process 500 may include "generate weights for AWB" 512, and this operation may include "factor segment overlap" 514. Particularly, and as mentioned, each segment within the same camera FOV can have a different weight. To generate the segment weights, $w_p[j]$ denotes the weights of FOV segment j for camera C[i] as follows:

$$\sum_{j \in fov_{pos}} w_p[j] = 1 \quad (9)$$

where j refers to left, right, or center segment as mentioned above.

In one example approach, the center FOV segment is assigned a higher weight than the left and right FOV overlap segments so that the sum of the weights of overlapping segments from multiple cameras and at the same region will equal the weight of the non-overlapping segment(s). One example setting for $w_p$ is as below when two segments overlap at the left and right segment of each camera (as shown on FIG. 2).

$$w_p[i][\text{left}] = 0.25 \quad (10)$$

$$w_p[i][\text{center}] = 0.5 \quad (11)$$

$$w_p[i][\text{right}] = 0.25 \quad (12)$$

So for this example, the wp[i][right]=0.25 from camera i=1, while the segment weight of the left segment from camera i=4 that overlaps the right segment is wp[i][left]=0.25, so that at the region with these two segments, the total region weight will be 0.25+0.25=0.5, which is the same as the non-overlapped segment. The total region weight does not actually need to be computed but merely shows one example weight arrangement. This provides equal influence on the total weight for each region (whether the region has a single non-overlapping segment or multiple overlapping segments), thereby providing a uniform influence of the region weights all around the vehicle. Also as mentioned, the segment weights $w_p$ may be determined whether or not vehicle motion also is to be considered.

It will be appreciated that other arrangements could be used instead, such as having a heavy segment weight on a certain side of the vehicle such as the front or back (regardless of the motion of the vehicle), and with the assumption the driver usually looks in that direction no matter the motion of the vehicle. Another arrangement could have segment weights emphasize where light is emitted from the vehicle. Many variations are contemplated.

Regarding the vehicle motion, process 500 may include "factor movement of vehicle" 516. As mentioned, once the vehicle direction and turning status is provided, camera weights may be allocated to emphasize the images from the camera or cameras that most closely face the direction the vehicle is moving. As to turns, in one example form, the larger the turning angle, the more AWB weight is applied proportionally to the camera that faces closer to the turning direction. In detail, camera weight $w_c(\ )$ denotes a function that computes weight allocations for each camera and for camera C[i] so that with weight $w_c[i]$, where $i \in [1, \ldots, N]$ cameras, the following is provided:

$$\sum_{i=1}^{N} w_c[i] = 1 \quad (13)$$

where camera weight $w_c$ is a tunable variable provided for each camera and may be different for different vehicle motion situations.

It can be understood that on a vehicle such as a car, only two of the four cameras on a four camera array will be involved in the turn motion of the vehicle. Thus, an initial operation is to determine which cameras are involved in the motion. So, camera weight $w_c[m]$ denotes camera weight for each side camera and m is either a left side camera (3) or a right side camera (4), where the camera weight $w_c[m]$ depends on $\text{vehicle}_{turn}$ as follows.

$$\begin{cases} m = 3 & \text{vehicle}_{turn} < 0 \\ m = 4 & \text{vehicle}_{turn} > 0 \end{cases} \quad (14)$$

Also, camera weight $w_c[n]$ denotes the camera weight for the front or rear camera and n is either the front camera (1) or rear camera (2), where the camera weight $w_c[n]$ depends on $\text{vehicle}_{dir}$ as follows.

$$\begin{cases} n = 1 & \text{vehicle}_{dir} = +1 \\ n = 2 & \text{vehicle}_{dir} = -1 \end{cases} \quad (15)$$

Once the involved cameras are determined, the camera weights can then be computed with a linear function or other equivalent function depending on the angle of the vehicle turn as follows.

$$W_c[m] = \frac{\text{abs}(\text{vehicle}_{turn})}{90} * 1.0 \quad (16)$$

$$W_c[n] = 1.0 - W_c[m] \quad (17)$$

where *1.0 is shown to illustrate the range of weights in this example is set to about 0.0 to 1.0, and where 90 degrees represents the total likely available attention angle of a viewer's or driver's eyes and head where a driver can focus attention, and relative to the vehicles central axis that indicates the straight direction of the vehicle. The weights for the other two cameras not involved in the motion may be set to 0.0.

Figure 5A:
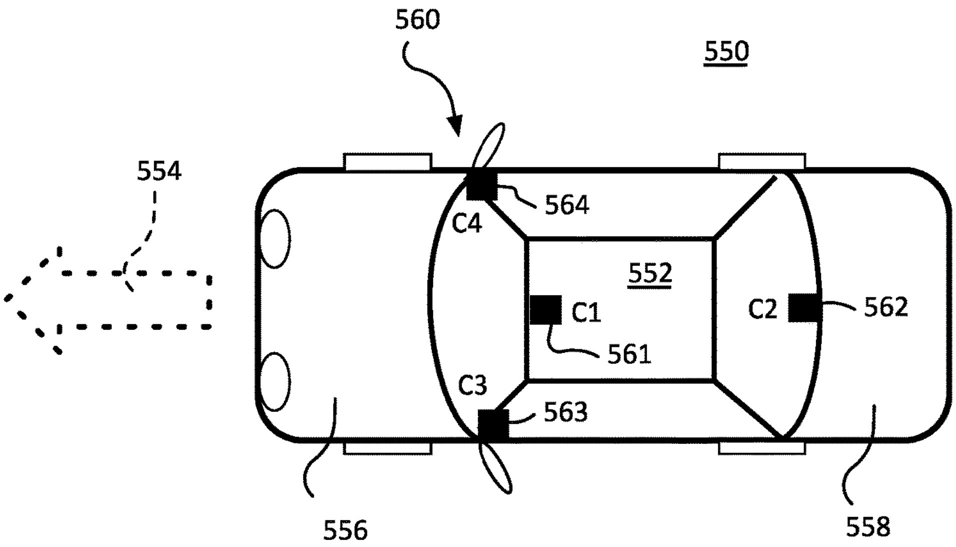
FIG. 5A is a schematic diagram showing motion of a vehicle in accordance with at least one of the implementations herein.
Figure 5B:
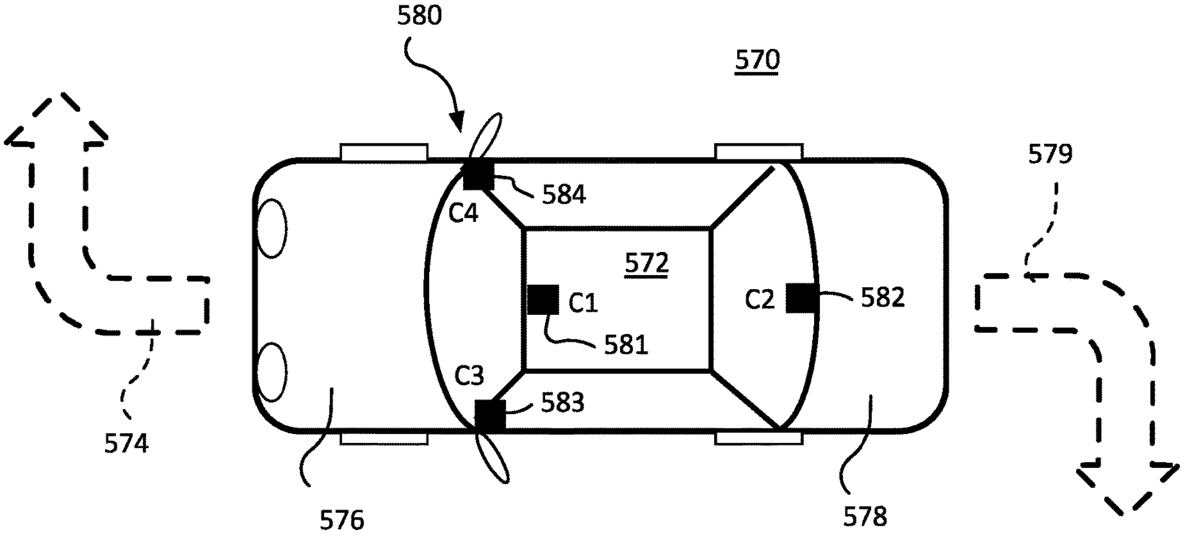
FIG. 5B is a schematic diagram showing other motion of a vehicle in accordance with at least one of the implementations herein.

Referring to FIGS. 5A-5B to show motion examples, four automotive motion use cases are shown on FIGS. 5A-5B. Referring to example Table 1 below, each use case is listed as (a) to (d) and may represent a different vehicle motion that is sensed. The computed weights corresponding to the motion also are listed for each use case (these numbers are used for explanation and are not necessarily real world values).

TABLE 1

Weights for example use cases

| | | | Weights for each camera | | | |
|---|---|---|---|---|---|---|
| Case | vehicle_ dir | vehicle_ turn | $w_c[1]$ (front) | $w_c[2]$ (rear) | $w_c[3]$ (left) | $w_c[4]$ (right) |
| (a) | 0 | 0 | 0.5 | 0.0 | 0.25 | 0.25 |
| (b) | 1 | 0 | 1.0 | 0.0 | 0.0 | 0.0 |
| (c) | 1 | 45 | 0.5 | 0.0 | 0.0 | 0.5 |
| (d) | −1 | −30 | 0.0 | 0.67 | 0.33 | 0.0 |

For cases (a) and (b) without turns, a vehicle setup 550 is shown with a vehicle 552 with a front end 556 and a rear end 558. A camera array 560 has a front camera C1 (561), a rear camera C2 (562), a left camera C3 (563), and a right camera C4 (564). In the case (a) when no vehicle motion exists, default or pre-defined camera weights are used where the camera weight of the front camera 561 is set at 0.5 while each side camera 563 and 564 is set at 0.25. This assumes a driver is sitting in the driver seat where a surround view can be seen on a dashboard of the vehicle 552. In this case, it is assumed the driver mostly will have his/her attention looking forward toward the front end 556 of the vehicle 552.

In the case (b) when the vehicle 552 is moving forward without turning as shown by dashed arrow 554, the front camera 561 has a weight of 1 while the weight of the other cameras 562-564 are all zero. This assumes all of the driver's attention is in the forward direction. The opposite is assumed when the vehicle 552 is moving straight backward in reverse. In that case, the rear camera 562 will receive all of the weight.

For use case (c), a vehicle 572 in a vehicle setup 570 is turning right at 45 degrees while the vehicle moves forward as shown by arrow 574, while in use case (d), the vehicle 572 is turning left at 30 degrees while the vehicle is moving in reverse as shown by arrow 579. In this example, the vehicle 572 has a front end 576 and a rear end 578. A camera array 580 has a front camera C1 (581), a rear camera C2 (582), a left camera C3 (583), and a right camera C4 (584). By one approach for a vehicle in a turn, more weight may be allocated to either the front or rear camera facing the general moving direction, such as the front camera 581 when the vehicle is moving forward or rear camera 582 when the vehicle is moving in reverse, and when the vehicle is traveling straighter than at an angle. In other words, these two cameras weights are larger than the side weights when the turning angle is less than or equal to about 45 degrees.

In the present example of case (c) when the vehicle 572 is moving forward and turning to the right as shown by dashed arrow 574, the weights are proportioned according to the amount of actual vehicle turn angle relative to the total attention angle according to equations (16) and (17) described above. Here, the actual turning angle is 45 degrees over 90 degree attention angle, and the vehicle is moving forward. Thus, both the front camera C1 (581) and the right side camera C4 (581 and 583) are involved in the motion, and both camera weights $w_c[1]$ and $w_c[4]$ are both 0.5. The cameras C2 and C3 (582 and 583) not involved in the motion have weights of zero.

For the use case (d) where the vehicle 572 is moving in reverse at an actual vehicle turning angle of 30 degrees, the cameras involved are the rear camera C2 (582) and the left side camera C3 (583). The weight of the left side camera $w_c[3]$ is 30/90 or 0.33, while the weight of the rear camera $w_c[2]$ is 1−0.33=0.67.

Thus, by these examples, the weights are directly proportional to the angles such that the camera with the largest proportion of the attention angle will have the largest weight. It will be appreciated that many variations could be used to set the camera weights, and according to different user preferences, and the present method is not limited to the exact algorithm described above regarding the angles and proportions. Other arrangements could be used to generate the camera weights when camera weights are being used. Thus, the weights may be tunable according to real automotive use cases.

Process 500 then may include "generate total segment weight" 517. After camera weights $w_c$ and segment weights $w_p$ are determined, a white balance correction weight for each FOV segment j of camera i can be computed by:

$$w[i][j] = \frac{w_c[i] * w_p[j]}{\sum_{k=1 \ldots N} \sum_{l \in fov_{pov}} w_c[k] * w_p[l]} \quad (18)$$

where w[i][j] is the total segment weight, * is multiplication, k is the camera number, and l is the segment of each camera. This also effectively normalizes the weight for each camera and each segment for a camera. The result is a normalized weight for each segment with two weights for a single region with overlapping segments, where each weight is for a different overlapping segment in the region. The normalized total segment weight is per segment so that each total segment weight provides the segments contribution to the average weight for all segments as shown below. Here for a camera array of four cameras, 12 total segment weights are provided (some of which may be zero as mentioned above).

Process 500 may include "compute unified AWB gains" 518. In detail, once the AWB segment statistics and the total segment weights are generated that are to be used to form a surround view, process 500 may use an AWB algorithm to generate the unified AWB gains. This first involves "generate combined weighted AWB values" 520. By one form, this may include finding average white point values formed of color scheme channel components for the segments as shown in the following equation.

$$\text{wtd\_RGB\_ave} = \left( \sum_{i=1}^{N} \sum_{j \in fov_{pos}} w[i][j] * awb_{comp}(stat_{seg}[i][j]) \right) \quad (19)$$

where here the equation is used with an RGB color scheme, the total segment weights are applied to the AWB values $awb_{comp}$, and the weighted $awb_{comp}$ is a per segment value that is a contribution to the average weight wtd_RGB_ave.

To generate the combined weighted AWB values, this operation includes "generate initial AWB-related values" 522, and where the initial AWB-related values here are white points or more specifically, the color channel components of the white points. Particularly, a white balance (AWB) algorithm with a function $awb_{comp}()$ uses the AWB segment statistics $stat_{seg}[i][j]$ generated above of the individual segments. The AWB algorithm may include performing color correlation, gamut mapping, gray-edge, and/or gray-world AWB methods. For the gray-world method, as an example, the averages for all color components are calculated and compared to gray. This establishes an initial white point. The AWB algorithms, as mentioned below, could be used to generate initial gains for each color component, but that is not necessary for this current example. So here, the calculations result in an initial white point of white components such as for a RGB color scheme.

The generating of the combined weighted AWB values next may include "apply weights" 523, where this refers to applying the weights to the initial white point component values as shown in equation (19) above. Here, each total segment weight w[i][j] computed as described above for a segment is multiplied by the initial AWB white point component of the segment. This may be repeated for each color channel (such as RGB) being used so that three weighted initial white point components are provided for each segment.

Thereafter, by this example, the generating of the combined weighted AWB values comprises summing the white point components, and then taking an average by dividing by the total number of segments used to generate the surround view, which is 12 here in the continuing example as mentioned above. Here, however the division is already performed by the normalizing of the total segment weights in equation (18). The average is determined for each color channel R, G, and B separately. The result is output (or unified) average (or otherwise combined) white point values that are to be used for all segments. It should be noted that instead of color channel scheme RGB, other color spaces such as R/G+B/G, CIELab, CIE XYZ color space, and so forth could be used instead.

Process 500 may include "generate unified AWB gains" 524, where finally the weighted average white point values can then be used to compute the unified AWB gains. The unified $awb_{gains}$ for R, G, B channels can be computed by:

$$awb_{gain[r]} = \frac{\text{wtd\_RGB\_avg}[g]}{\text{wtd\_RGB\_avg}[r]} \tag{20}$$

$$awb_{gain[g]} = 1.0 \tag{21}$$

$$awb_{gain[b]} = \frac{\text{wtd\_RGB\_avg}[g]}{\text{wtd\_RGB\_avg}[b]} \tag{22}$$

The unified AWB gains are computed using the ratios of equations 20-22 rather than the weighted average white point components directly to keep the gain for G channel at 1.0 which maintains a constant overall brightness after white balance correction. In this case then, white balance correction is performed by adjusting the R and B gains.

By other alternatives, the AWB algorithm $AWB_{comp}()$ computes both initial white points and then initial AWB gains as the initial AWB-related values. These initial AWB gains are then weighted and combined such as averaged to form average gains of the segments. These average gains then may be used as the unified AWB gains to apply to the images.

Process 500 may include "apply unified AWB gains to images of multiple cameras at same time point" 526. Thus, by one example, the unified AWB gains are applied to each or all images of a camera array on a vehicle or other object and that contribute images to form a same surround view for example. The result is a set of images from the same or substantially the same time point that are all (or individually) unified AWB-corrected with the same unified AWB gains.

Process 500 then may include "output frames for stitching" 528. With the unified white balance gain, the same white balance correction is applied to the output from each or individual camera, and these output frames are fed into the surround view unit to form a resulting multi-perspective output with no or reduced need for solely AWB-related color post-processing. Thus, the quality of the surround view is improved, especially, or at least, on a part of the surround view that faces, or is in, a direction of motion of a vehicle (or on a side of a vehicle that face the direction the vehicle is moving), and the computational load to generate the surround view is reduced.

By one approach, once the images are stitched together post-processing is usually performed where the term "post-processing" is relative to the stitching operation. Here, however, no post-processing solely related to AWB needs to be performed. Otherwise, other post-processing not solely related to AWB may be performed including color space conversion such as raw RGB to sRGB or YUV conversion, and other smoothing (or de-noising) or correction such as gamma correction, image sharpening, and so on.

Next, the processed image may be displayed or stored as described herein. Alternatively, or additionally, the image data may be provided to an encoder for compression and transmission to another device with a decoder for display or storage, especially when the camera array is on a self-driving vehicle such as a drone. In this case, a remote driver or user may view the surround views on a remote computer or other computing device, such as a smartphone or drone control console.

While implementation of the example processes 300 and 500 discussed herein may include the undertaking of all operations shown in the order illustrated, the present disclosure is not limited in this regard and, in various examples, implementation of the example processes herein may include only a subset of the operations shown, operations performed in a different order than illustrated, or additional or less operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 6:
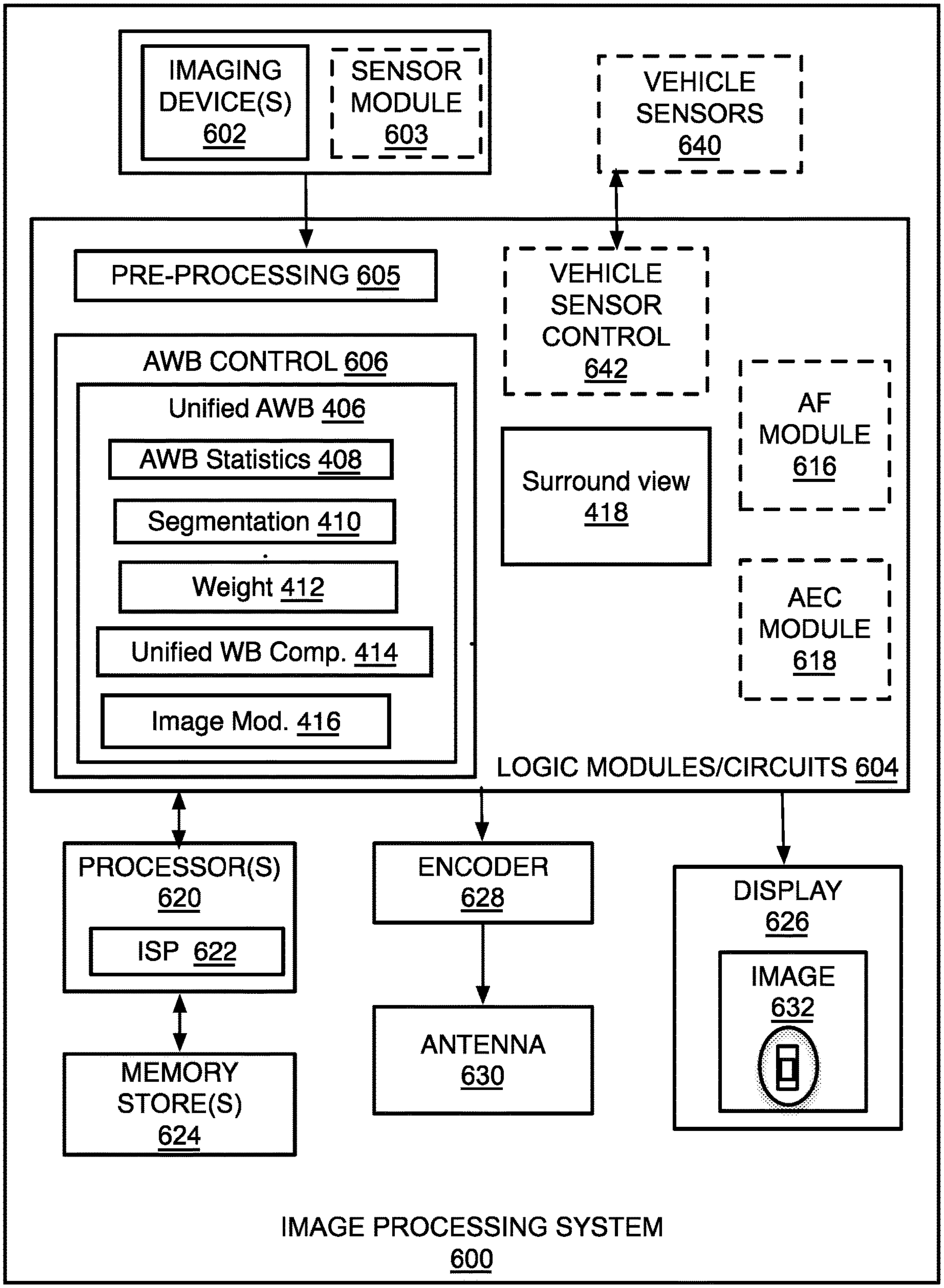
FIG. 6 is a schematic diagram of an example system.

Referring to FIG. 6, an example image processing system 600 is arranged in accordance with at least some implementations of the present disclosure. In various implementations, the example image processing system 600 may have one or more imaging devices 602 to form or receive captured image data. This can be implemented in various ways. Thus, in one form, the image processing system 600 may be one or more digital cameras in a camera array or other image capture device, and imaging device 602, in this case, may be the camera hardware and camera sensor software or module 603. In other examples, imaging processing system 600 may have a camera array with one or more imaging devices 602 that include or may be cameras, and the logic modules 604 may communicate remotely with, or otherwise may be communicatively coupled to, the imaging devices 602 for further processing of the image data.

In either case, such technology may include at least one camera or camera array that may be a digital camera system, a dedicated camera device, or an imaging phone, whether a still picture or video camera or some combination of both. By one form, the technology includes an on-board camera array mounted on a vehicle or other object such as a building. In one form, imaging device 602 may include camera hardware and optics including one or more sensors as well as auto-focus, zoom, aperture, ND-filter, auto-exposure, flash, and actuator controls. These controls may be part of a sensor module 603 for operating the sensor. The sensor module 603 may be part of the imaging device 602, or may be part of the logical modules 604 or both. Such sensor module can be used to generate images for a viewfinder and take still pictures or video. The imaging device 602 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS) or a charge-coupled device-type image sensor (CCD)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 602 may be provided with an eye tracking camera.

In the illustrated example, the logic modules or circuits 604 include a pre-processing unit 605, an AWB control 606, optionally a vehicle sensor control 642 in communication with vehicle sensors 640 when the camera array 602 is mounted on a vehicle, and optionally an auto-focus (AF) module 616 and an auto exposure correction (AEC) module 618 when the AWB control is considered to be part of a 3A package to set new settings for illumination exposure and lens focus for the next image captured in an image capturing device or camera. The vehicle sensors may include one or more accelerometers, and so forth, that at least detect the motion of the vehicle.

The AWB control 606 may have the unified AWB unit 406 (FIG. 4), which in turn has the AWB statistics unit 408, segmentation unit 410, weight unit 412, unified WB computation unit 414, and image modifier unit 416. The AWB control 606 sets initial white points (or WB gains) for each or individual segment and camera, then weighs those gains depending on the segment and camera. The same gains are then applied to each or multiple images as described above. Otherwise, the details and relevant units are already described above and need not be described again here.

Also in the illustrated form, the image processing system 600 may have processor circuitry that forms one or more processors 620 which may include one or more dedicated image signal processors (ISPs) 622, and such as the Intel Atom, memory stores 624, one or more displays 626, encoder 628, and antenna 630. In one example implementation, the image processing system 600 may have the display 626, at least one processor 620 communicatively coupled to the display, at least one memory 624 communicatively coupled to the processor, and an automatic white balancing unit or AWB control coupled to the processor to adjust the white point of an image so that the colors in the image may be corrected as described herein. The encoder 628 and antenna 630 may be provided to compress the modified image date for transmission to other devices that may display or store the image, such as when the vehicle is a self-driving vehicle. It will be understood that the image processing system 600 also may include a decoder (or encoder 628 may include a decoder) to receive and decode image data from a camera array for processing by the system 600. Otherwise, the processed image 632 may be displayed on display 626 or stored in memory 624. As illustrated, any of these components may be capable of communication with one another and/or communication with portions of logic modules 604 and/or imaging device(s) 602. Thus, processors 620 may be communicatively coupled to both the image device 602 and the logic modules 604 for operating those components. By one approach, Although image processing system 600, as shown in FIG. 6, may include one particular set of blocks or actions associated with particular modules, these blocks or actions may be associated with different modules than the particular module illustrated here.

Figure 7:
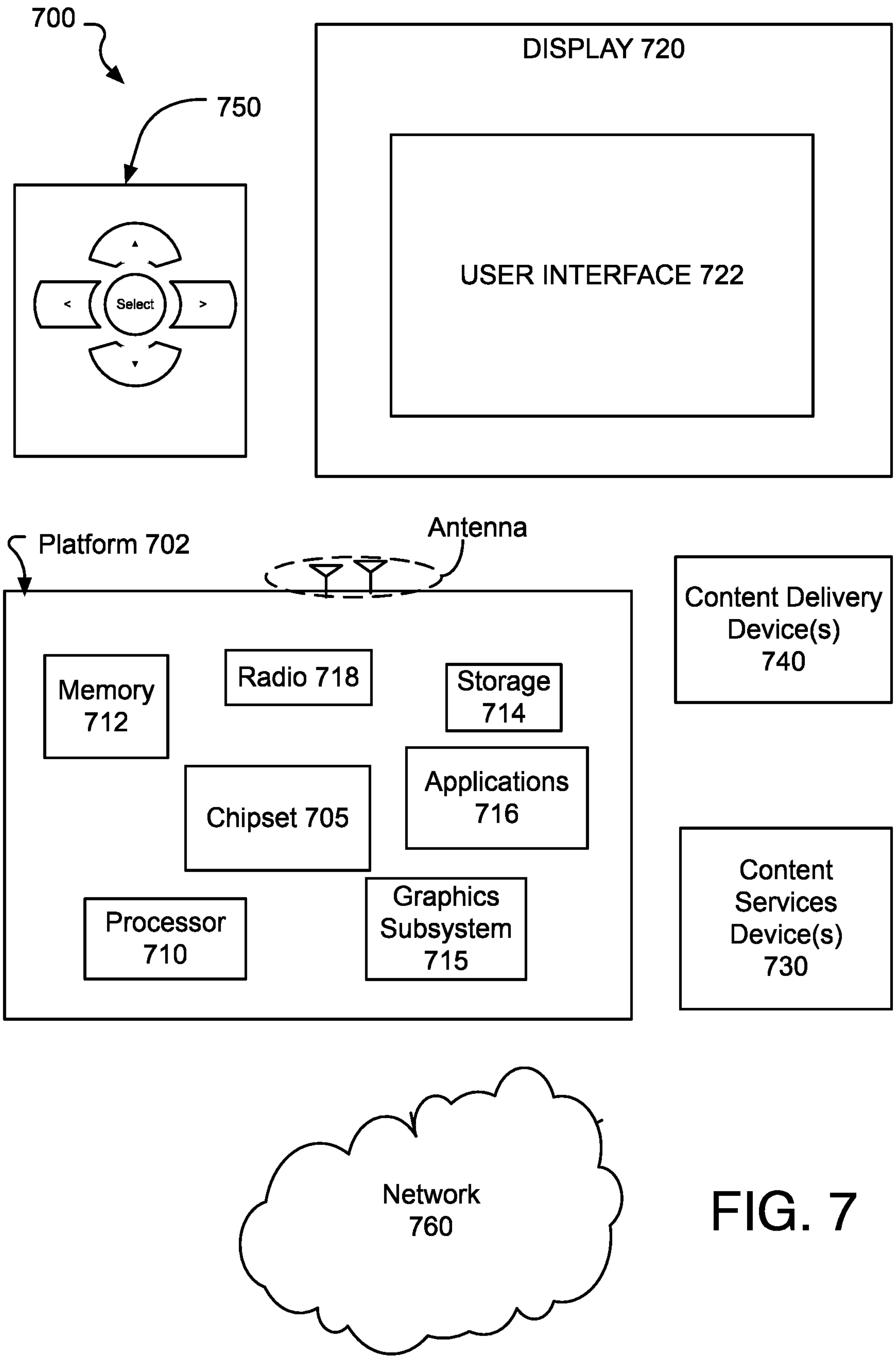
FIG. 7 is a schematic diagram of another example system.

Referring to FIG. 7, an example system 700 in accordance with the present disclosure operates one or more aspects of the image processing system described herein, including one or more cameras of the camera array, and/or a device remote from the camera array that performs the image processing described herein. It will be understood from the nature of the system components described below that such components may be associated with, or used to operate, certain part or parts of the image processing system described above. In various implementations, system 700 may be a media system although system 700 is not limited to this context. For example, system 700 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, Display Port, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In implementations, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In implementations, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various implementations, platform 702 and display 720 may be an integrated unit. Display 720 and content service device(s) 730 may be integrated, or display 720 and content delivery device(s) 740 may be integrated, for example. These examples are not meant to limit the present disclosure.

In various implementations, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 7.

Figure 8:
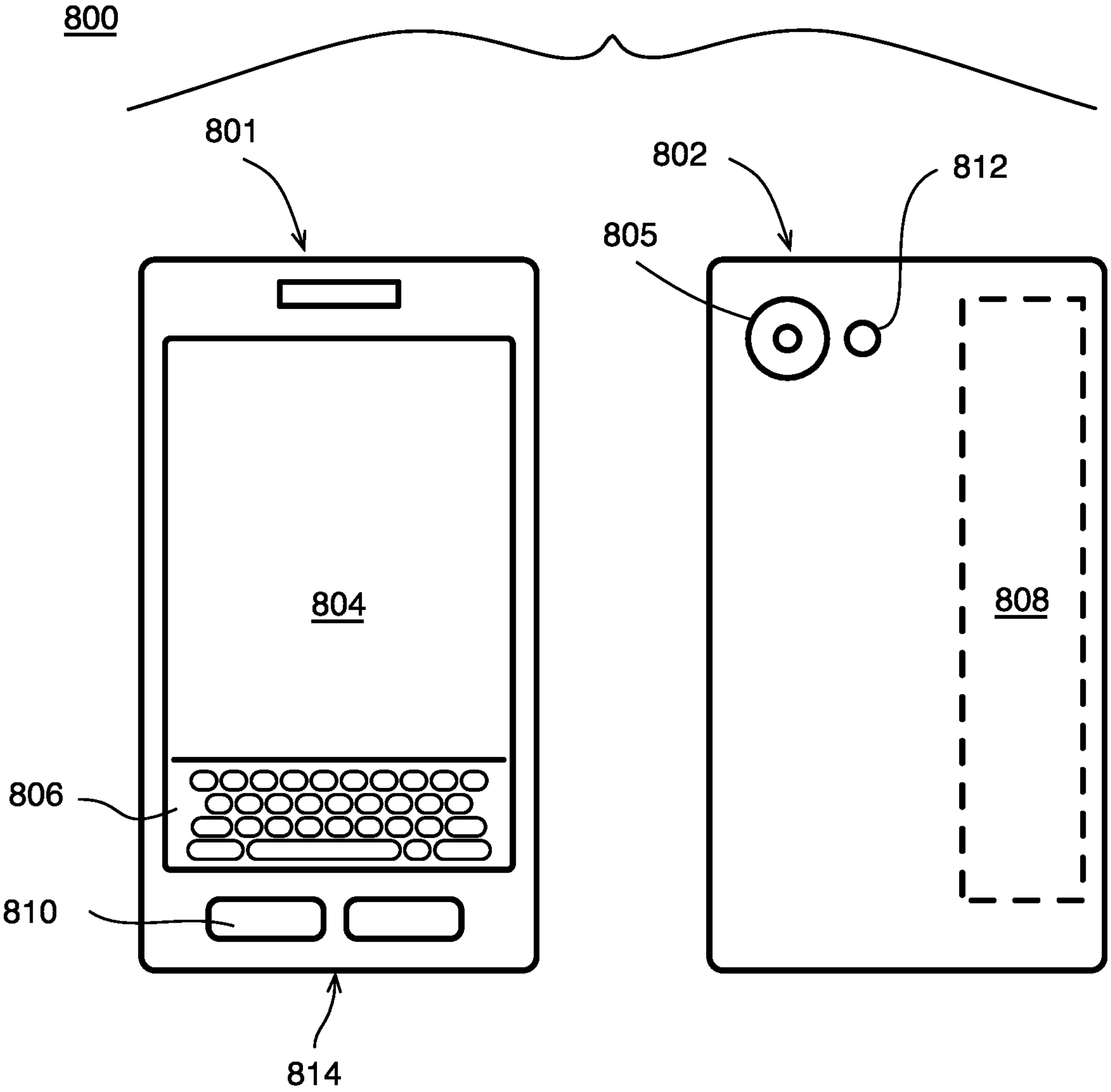
FIG. 8 is a schematic diagram of another example system, all arranged in accordance with at least some implementations of the present disclosure.

As described above, system 600 or 700 may be embodied in varying physical styles or form factors. FIG. 8 illustrates an example small form factor device 800, arranged in accordance with at least some implementations of the present disclosure. In some examples, system 600 or 700 may be implemented via device 800. In other examples, system 400 or portions thereof may be implemented via device 800. In various implementations, for example, device 800 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 8, device 800 may include a housing with a front 801 and a back 802. Device 800 includes a display 804, an input/output (I/O) device 806, and an integrated antenna 808. Device 800 also may include navigation features 810. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone (not shown), or may be digitized by a voice recognition device. As shown, device 800 may include one or more cameras 805 (e.g., including a lens, an aperture, and an imaging sensor) and a flash 812 integrated into back 802 (or elsewhere) of device 800. In other examples, camera 805 and flash 812 may be integrated into front 801 of device 800 or both front and back cameras may be provided. Camera 805 and flash 812 may be components of a camera module to originate image data processed into streaming video that is output to display 804 and/or communicated remotely from device 800 via antenna 808 for example.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer-implemented method of image processing comprises obtaining a plurality of images captured by one or more cameras and of different perspectives of the same scene; automatically determining at least one unified automatic white balance (AWB) gain of the plurality of images; applying the at least one unified AWB gain to the plurality of images; and generating a combined view comprising combining the images after the at least one unified AWB gain is applied to the individual images.

By one or more second implementation, and further to the first implementation, wherein the determining comprises determining two or more initial AWB-related values of the individual images and combining the initial AWB-related values of multiple images to form the unified AWB gain.

By one or more third implementations, and further to the first implementation, wherein the determining comprises determining two or more initial AWB-related values of the individual images and combining the initial AWB-related values of multiple images to form the unified AWB gain, and wherein the determining comprises determining weights and the initial AWB-related values for segments of the individual images to form the unified AWB gain.

By one or more fourth implementations, and further to the first implementation, wherein the determining comprises determining two or more initial AWB-related values of the individual images and combining the initial AWB-related values of multiple images to form the unified AWB gain, wherein the determining comprises determining weights and the initial AWB-related values for segments of the individual images to form the unified AWB gain, and wherein the segments are divided into overlapping segments wherein at least two of the images overlap, and non-overlapping segments wherein none of the images overlap.

By one or more fifth implementations, and further to the first implementation, wherein the determining comprises determining two or more initial AWB-related values of the individual images and combining the initial AWB-related values of multiple images to form the unified AWB gain, wherein the determining comprises determining weights and the initial AWB-related values for segments of the individual images to form the unified AWB gain, wherein the segments are divided into overlapping segments wherein at least two of the images overlap, and non-overlapping segments wherein none of the images overlap, and wherein the overlapped segment of a single camera is weighted less than the non-overlapped segment of the single camera.

By one or more sixth implementations, and further to the first implementation, wherein the determining comprises determining two or more initial AWB-related values of the individual images and combining the initial AWB-related values of multiple images to form the unified AWB gain, wherein the determining comprises determining weights and the initial AWB-related values for segments of the individual images to form the unified AWB gain, wherein the segments are divided into overlapping segments wherein at least two of the images overlap, and non-overlapping segments wherein none of the images overlap, and wherein the overlapped segments that overlap at a substantially same region and from multiple cameras each have a reduced weight so that the total weight of the overlapped segments at the same region is equal to the weight of the non-overlapped segment of one of the cameras.

By one or more seventh implementations, and further to the first implementation, wherein the determining comprises determining two or more initial AWB-related values of the individual images and combining the initial AWB-related values of multiple images to form the unified AWB gain, wherein the determining comprises determining weights and the initial AWB-related values for segments of the individual images to form the unified AWB gain, and wherein the determining comprises determining weights for images at least partly depending on camera positions on a vehicle and motion of the vehicle relative to the positions.

By one or more example eighth implementations, a computer-implemented system of image processing comprises memory to store at least image data of images from one or more cameras; and processor circuitry forming at least one processor communicatively coupled to the memory and being arranged to operate by: obtaining a plurality of images captured by the one or more cameras and of different perspectives of the same scene; automatically determining at least one unified automatic white balance (AWB) gain of the plurality of images; applying the at least one unified AWB gain to the plurality of images; and generating a surround view comprising combining the images after the unified AWB gain is applied to the individual images.

By one or more ninth implementations, and further to the eighth implementation, wherein the determining comprises determining one or more initial AWB-related values of individual segments forming the images and combining the initial AWB-related values to form the unified AWB.

By one or more tenth implementations, and further to the ninth implementation, wherein the determining comprises determining one or more initial AWB-related values of individual segments forming the images and combining the initial AWB-related values to form the unified AWB, and wherein the determining comprises determining AWB weights per segment to form weighted initial AWB-related values to be used to form the unified AWB gain, wherein the initial AWB-related values are AWB gains or white point components.

By one or more eleventh implementations, and further to the ninth implementation, wherein the determining comprises determining one or more initial AWB-related values of individual segments forming the images and combining the initial AWB-related values to form the unified AWB, and wherein the determining comprises determining weights at least partly depending on camera positions on a vehicle and motion of the vehicle relative to the positions.

By one or more twelfth implementations, and further to the eleventh implementation, wherein the determining comprises determining one or more initial AWB-related values of individual segments forming the images and combining the initial AWB-related values to form the unified AWB, wherein the determining comprises determining weights at least partly depending on camera positions on a vehicle and motion of the vehicle relative to the positions, and wherein the processor is arranged to operate by generating the weights depends on whether or not a camera faces a direction of vehicle motion more than other cameras.

By one or more example thirteenth implementations, a vehicle comprises a body; a camera array mounted on the body with each camera having at least a partially different perspective; and processor circuitry forming at least one processor communicatively coupled to the camera array and being arranged to operate by: obtaining a plurality of images captured by one or more cameras of the camera array and of different perspectives of the same scene, automatically determining a unified automatic white balance (AWB) gain of a plurality of the images, applying the unified AWB gain to the plurality of images, and generating a surround view comprising combining the images after the unified AWB gain is applied to the individual images.

By one or more fourteenth implementations, and further to the thirteenth implementation, wherein the determining comprises determining one or more initial AWB-related values of segments of the individual images and combining the initial AWB-related values to form the unified AWB gain.

By one or more fifteenth implementation, and further to the thirteenth or fourteenth implementation, wherein the determining comprises at least one of (1) determining weights of the segments to form the initial AWB-related values, and (2) determining weights of images at least partly depending on camera positions on the vehicle and motion of the vehicle relative to the positions.

By an example sixteenth implementation, at least one non-transitory article comprises at least one computer-readable medium having stored thereon instructions that when executed, cause a computing device to operate by: obtaining a plurality of images captured by one or more cameras and of different perspectives of the same scene; automatically determining at least one unified automatic white balance (AWB) gain of the plurality of images; applying the at least one unified AWB gain to the images; and generating a surround view comprising combining the images after the at least one unified AWB gain is applied to the individual images.

By one or more seventeenth implementation, and further to the sixteenth implementation, wherein the determining comprises determining one or more initial AWB-related values of segments forming the individual images and combining the initial AWB related values to form the unified AWB.

By one or more eighteenth implementations, and further to the sixteenth implementation, wherein the determining comprises determining one or more initial AWB-related values of segments forming the individual images and combining the initial AWB related values to form the unified AWB, and wherein the determining comprises (1) determining weights of the segments to form the initial AWB-related values, and (2) determining weights of images at least partly depending on camera positions on a vehicle and motion of a vehicle relative to the positions.

By one or more nineteenth implementations, and further to any of the sixteenth to eighteenth implementation, wherein the determining comprises providing a weight value of at least one of the cameras at least partly depending on whether a vehicle is moving forward, stopped, or moving backward.

By one or more twentieth implementations, and further to any of the sixteenth to nineteenth implementation, wherein the determining comprises providing a weight value of at least one of the cameras at least partly depending on whether a vehicle is turning left, right, or remaining straight.

By one or more twenty-first implementations, and further to any of the sixteenth to twentieth implementation, wherein the determining comprises providing a weight value of at least one of the cameras at least partly depending on the size of an angle of a vehicle turn relative to a reference direction, wherein the vehicle carries the cameras.

By one or more twenty-second implementations, and further to any of the sixteenth to twenty-first implementation, wherein the determining comprises providing weights proportioned among multiple cameras providing the images so that a camera facing the direction of a turn more than the other cameras receives the largest weight.

By one or more twenty-third implementation, and further to the twenty-second implementation, wherein the determining comprises providing a weight of at least one camera among multiple cameras providing the images and that is a ratio of a vehicle turning angle that a vehicle carrying the cameras is turning and an attention angle that is deemed a range of possible driver facing orientations of a driver of the vehicle.

In one or more twenty-fourth implementations, at least one machine readable medium includes a plurality of instructions that in response to being executed on a computing device, cause the computing device to perform a method according to any one of the above implementations.

In one or more twenty-fifth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A method comprising:

obtaining a plurality of images captured by a plurality of cameras, the images associated respectively with different fields of view of a same scene, ones of the images having multiple image segments;

determining respective segment weights for corresponding ones of the image segments of the images, values of the respective segment weights based on whether the corresponding ones of the image segments are associated with respective fields of view that overlap or do not overlap with other ones of the fields of view;

determining respective camera weights for corresponding ones of the cameras, values of the respective camera weights based on respective positions of the cameras and motion associated with the cameras;

determining at least one unified automatic white balance (AWB) gain for the images based on the segment weights and the camera weights; and combining the images based on the at least one unified AWB gain to generate a combined view of the scene.

2. The method of claim 1, wherein the determining of the at least one unified AWB gain includes:

determining respective initial AWB values for the corresponding ones of the image segments of the images;

determining respective correction weights for the corresponding ones of the image segments based on multiplication of the segment weights and the camera weights; and combining the initial AWB values based on the correction weights to form the at least one unified AWB gain.

3. The method of claim 1, wherein a first one of the cameras is associated with a first one of the fields of view, and including segmenting a first one of the images associated with the first one of the cameras into at least three image segments, the at least three image segments including (i) a non-overlapped segment including a first plurality of pixels that do not overlap with the other ones of the fields of view, (ii) a first overlapped segment including a second plurality of pixels that overlaps with a second one of the fields of view, and (iii) a second overlapped segment including a third plurality of pixels that overlaps with a third one of the fields of view, and wherein the determining of the respective segment weights includes determining a first segment weight for the first overlapped segment, determining a second segment weight for the second overlapped segment, and determining a third segment weight for the non-overlapped segment, the third segment weight larger than the first segment weight and the second segment weight.

4. The method of claim 3, wherein a sum of the first segment weight of the first overlapped segment and the second segment weight of the second overlapped segment is equal to the third segment weight of the non-overlapped segment.

5. A system of comprising:

memory to store at least image data of a plurality of images from a plurality of cameras, the images associated respectively with different fields of view of a same scene, ones of the images having multiple image segments;

machine readable instructions; and at least one processor circuit to be programmed based on the machine readable instructions to:

determine respective segment weights for corresponding ones of the image segments of the images, values of the respective segment weights based on whether the corresponding ones of the image segments are associated with respective fields of view that overlap or do not overlap with other ones of the fields of view;

determine respective camera weights for corresponding ones of the cameras, values of the respective camera weights based on respective positions of the cameras and motion associated with the cameras;

determine at least one unified automatic white balance (AWB) gain for the images based on the segment weights and the camera weights; and combine the images based on the unified AWB gain to generate a surround view of the scene.

6. The system of claim 5, wherein one or more of the at least one processor circuit is to:

determine respective initial AWB values for the corresponding ones of the image segments;

determine respective correction weights for the corresponding ones of the image segments based on multiplication of the segment weights and the camera weights; and combine the initial AWB values based on the correction weights to form the at least one unified AWB gain.

7. The system of claim 6, wherein the initial AWB values include at least one of respective initial AWB gains or respective initial white point components for the corresponding ones of the image segments.

8. The system of claim 5, including comprising a vehicle, the vehicle including:

a body; and a camera array mounted on the body, the camera array including the plurality of cameras, ones of the cameras in the camera array having at least partially different perspectives, wherein one or more the at least one processor circuit is communicatively coupled to the camera array.

9. The system of claim 5, wherein one of more of the at least one processor circuit is to determine the camera weights based on a size of an angle of a vehicle turn relative to a total attention angle.

10. At least one non-transitory computer-readable medium comprising instructions to cause a computing device to at least:

obtain a plurality of images captured by a plurality of cameras, the images associated respectively with different fields of view of a same scene, ones of the images having multiple image segments;

determine respective segment weights for corresponding ones of the image segments of the images, values of the respective segment weights based on whether the corresponding ones of the image segments are associated with respective fields of view that overlap or do not overlap with other ones of the fields of view;

determine respective camera weights for corresponding ones of the cameras, values of the respective camera weights based on respective positions of the cameras and motion associated with the cameras;

determine at least one unified automatic white balance (AWB) gain for the images based on the segment weights and the camera weights; and combine the images based on the at least one unified AWB gain to generate a combined view of the scene.

11. The article at least one non-transitory computer-readable medium of claim 10, wherein the instructions are to cause the computing device to determine the camera weights based on a ratio of a vehicle turning angle associated with a vehicle carrying the cameras to a total attention angle that represents a range of possible driver facing orientations of a driver of the vehicle.

12. The method of claim 2, wherein the combining of the initial AWB values based on the correction weights includes:

multiplying the respective initial AWB values by corresponding ones of the respective correction weights to determine respective weighted AWB values for the corresponding ones of the image segments;

determining an average AWB value based on summation of the weighted AWB values; and determining the at least one unified AWB gain based on the average AWB value.

13. The method of claim 2, wherein the initial AWB values include at least one of respective initial AWB white point values or respective initial AWB gain values for the corresponding ones of the image segments.

14. The method of claim 1, wherein the determining of the camera weights is based on a ratio of a turning angle associated with the motion to a total attention angle.

15. The system of claim 5, wherein a first one of the cameras is associated with a first one of the fields of view, and one or more of the at least one processor circuit is to:

segment a first one of the images associated with the first one of the cameras into at least three image segments, the at least three image segments including (i) a non-overlapped segment including a first plurality of pixels that do not overlap with the other ones of the fields of view, (ii) a first overlapped segment including a second plurality of pixels that overlaps with a second one of the fields of view, and (iii) a second overlapped segment including a third plurality of pixels that overlaps with a third one of the fields of view;

determine a first segment weight for the first overlapped segment;

determine a second segment weight for the second overlapped segment; and determine a third segment weight for the non-overlapped segment, the third segment weight larger than the first segment weight and the second segment weight.

16. The system of claim 15, wherein a sum of the first segment weight of the first overlapped segment and the second segment weight of the second overlapped segment is equal to the third segment weight of the non-overlapped segment.

17. The system of claim 6, wherein one or more of the at least one processor circuit is to combine the initial AWB values to form the at least one unified AWB gain by:

multiplying the respective initial AWB values by corresponding ones of the respective correction weights to determine respective weighted AWB values for the corresponding ones of the image segments;

determining an average AWB value based on summation of the weighted AWB values; and determining the at least one unified AWB gain based on the average AWB value.

18. The at least one non-transitory computer-readable medium of claim 10, wherein a first one of the cameras is associated with a first one of the fields of view, and the instructions are to cause the computing device to:

segment a first one of the images associated with a first one of the cameras into at least three image segments, the at least three image segments including (i) a non-overlapped segment including a first plurality of pixels that do not overlap with the other ones of the fields of view, (ii) a first overlapped segment including a second plurality of pixels that overlaps with a second one of the fields of view, and (iii) a second overlapped segment including a third plurality of pixels that overlaps with a third one of the fields of view;

determine a first segment weight for the first overlapped segment;

determine a second segment weight for the second overlapped segment; and determine a third segment weight for the non-overlapped segment, the third segment weight equal to a sum of the first segment weight and the second segment weight.

19. The at least one non-transitory computer-readable medium of claim 10, wherein the instructions are to cause the computing device to:

determine respective initial AWB values for the corresponding ones of the image segments;

determine respective correction weights for the corresponding ones of the image segments based on multiplication of the segment weights and the camera weights; and combine the initial AWB values based on the correction weights to form the at least one unified AWB gain.

20. The at least one non-transitory computer-readable medium of claim 19, wherein the instructions are to cause the computing device to combine the initial AWB values to form the at least one unified AWB gain by:

multiplying the respective initial AWB values by corresponding ones of the respective correction weights to determine respective weighted AWB values for the corresponding ones of the image segments;

determining an average AWB value based on summation of the weighted AWB values; and determining the at least one unified AWB gain based on the average AWB value.

* * * * *